US006847829B2

(12) United States Patent
Tanaka et al.

(10) Patent No.: US 6,847,829 B2
(45) Date of Patent: Jan. 25, 2005

(54) MULTIBAND HIGH-FREQUENCY SWITCH

(75) Inventors: Masaharu Tanaka, Uji (JP); Hideaki Nakakubo, Kyoto (JP); Yasushi Nagata, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 293 days.

(21) Appl. No.: 10/147,934

(22) Filed: May 16, 2002

(65) Prior Publication Data

US 2003/0008693 A1 Jan. 9, 2003

(30) Foreign Application Priority Data

May 18, 2001 (JP) ....................................... 2001-149100
Mar. 18, 2002 (JP) ....................................... 2002-073628

(51) Int. Cl.[7] .................................................. H04B 1/38

(52) U.S. Cl. ........................ 455/552.1; 455/73; 455/78; 455/80; 455/82; 455/83; 455/84; 370/276; 370/278; 370/282; 333/100; 333/101

(58) Field of Search ................................ 455/552.1, 73, 455/78, 80, 82, 83, 84; 370/276, 278, 282; 333/100, 101

(56) References Cited

U.S. PATENT DOCUMENTS 6,633,748 B1 * 10/2003 Watanabe et al. ............. 455/78
2004/0127182 A1 * 7/2004 Hayaski ................... 455/193.1

FOREIGN PATENT DOCUMENTS

| | | | | |
|---|---|---|---|---|
| EP | 0964477 A1 | * 12/1999 | .......... H01Q/21/31 |
| JP | 08097743 A | 4/1996 | |
| JP | 11225088 A | 8/1999 | |
| JP | 11340872 | * 12/1999 | |

* cited by examiner

*Primary Examiner*—Lee Nguyen
*Assistant Examiner*—Minh D. Dao
(74) *Attorney, Agent, or Firm*—Akin Gump Strauss Hauer & Feld, L.L.P.

(57) ABSTRACT

A multiband high-frequency switch that is mainly used for mobile phones, comprising a strip line formed of the series connection of first and second strip lines. A second transmitting port is connected to the connection point of the strip lines connected in series via a third diode, and a second control port is connected between the second transmitting port and the third diode. In addition, first and second receiving ports are connected to the receiving-side port of the high-frequency switch via a diplexer.

15 Claims, 5 Drawing Sheets

MULTIBAND HIGH-FREQUENCY SWITCH

BACKGROUND OF THE INVENTION

The present invention relates to a multiband high-frequency switch that is mainly used for mobile phones.

In electric waves for mobile phones, two frequencies are set in two different frequency bands (for example, 800 MHz band and 1.8 GHz band), respectively. The two frequencies in the respective frequency bands are used for transmission and reception, respectively. Each mobile phone is provided with a multiband high-frequency switch for distinguishing between the respective transmitting and receiving signals in the above-mentioned two different frequency bands. A conventional multiband high-frequency switch 101 is shown in FIG. 6.

In the multiband high-frequency switch 101 shown in FIG. 6, the frequency of the transmitting signal to be sent to an antenna port 105 and the frequency of the receiving signal to be input from the antenna port 105 are diplexed to their respective frequency bands by a diplexer 102. The signals in the respective frequency bands, diplexed by the diplexer 102, are transmitted to single-port double-throw (SPDT) high-frequency switches 103 and 113. In the high-frequency switches 103 and 113, the signals having two frequencies are switched to a receiving signal and a transmitting signal, respectively, by diodes 19*a*, 19*b*, 19*c* and 19*d* operating as switching elements. The receiving signal is transmitted to receiving ports 113*a* and 123*a*, and the transmitting signal is input from transmitting ports 113*b* and 123*b*. Surface acoustic wave filters 120 and 121 are connected to the receiving ports 113*a* and 123*a*, respectively. Filters 121 and 122 are connected to the transmitting ports 113*b* and 123*b*, respectively In this conventional multiband high-frequency switch 101, a circuit block is provided for each of the diplexing and switching functions. Hence, one diplexer 102 and two high-frequency switches 103 and 113 are definitely necessary. For this reason, the number of circuit elements constituting the diplexer 102 and the high-frequency switches 103 and 113 is very large, whereby it is difficult to make the multiband high-frequency switch 101 compact.

BRIEF SUMMARY OF THE INVENTION

A multiband high-frequency switch in accordance with the present invention comprises a first switching element provided between an antenna port and a first transmitting port, a strip line connected between the antenna port and a receiving-side port, a second switching element, one terminal of which is connected between the strip line and the receiving-side port and the other terminal of which is grounded. A first control port is connected between the first switching element and the first transmitting port, and first and second receiving ports are connected to the receiving-side port via a diplexer. The strip line is formed of first and second strip lines connected in series. A second transmitting port is connected between the first and second strip lines via a third switching element. A second control port is connected between the second transmitting port and the third switching element.

A multiband high-frequency switch in accordance with another aspect of the present invention comprises a first switching element provided between an antenna port and a first transmitting port, the series connection of first and second strip lines connected between the antenna port and a receiving-side port, and a second switching element, one terminal of which is connected between the series connection and the receiving-side port and the other terminal of which is grounded. A first control port is connected between the first switching element and the first transmitting port, and a second transmitting port is connected between the first and second strip lines via a third switching element. A second control port is connected between the second transmitting port and the third switching element.

According to the present invention, the strip line constituting the high-frequency switch is formed of the series connection of the first and second strip lines. The second transmitting port is connected at the connection part of the first and second strip lines via the third switching element. The second control port is connected between the second transmitting port and the third switching element, and the first and second receiving ports are connected to the receiving-side port of the high-frequency switch via the diplexer. With this configuration, the multiband high-frequency switch comprises three diodes. Hence, the number of diodes is smaller than that of the conventional multiband high-frequency switch, whereby the circuit of the multiband high-frequency switch is simplified.

DETAILED DESCRIPTION OF THE INVENTION

Multiband high-frequency switches in accordance with preferred embodiments of the present invention will be described below referring to FIG. 1 to FIG. 5.

<<First Embodiment>>

Figure 1:
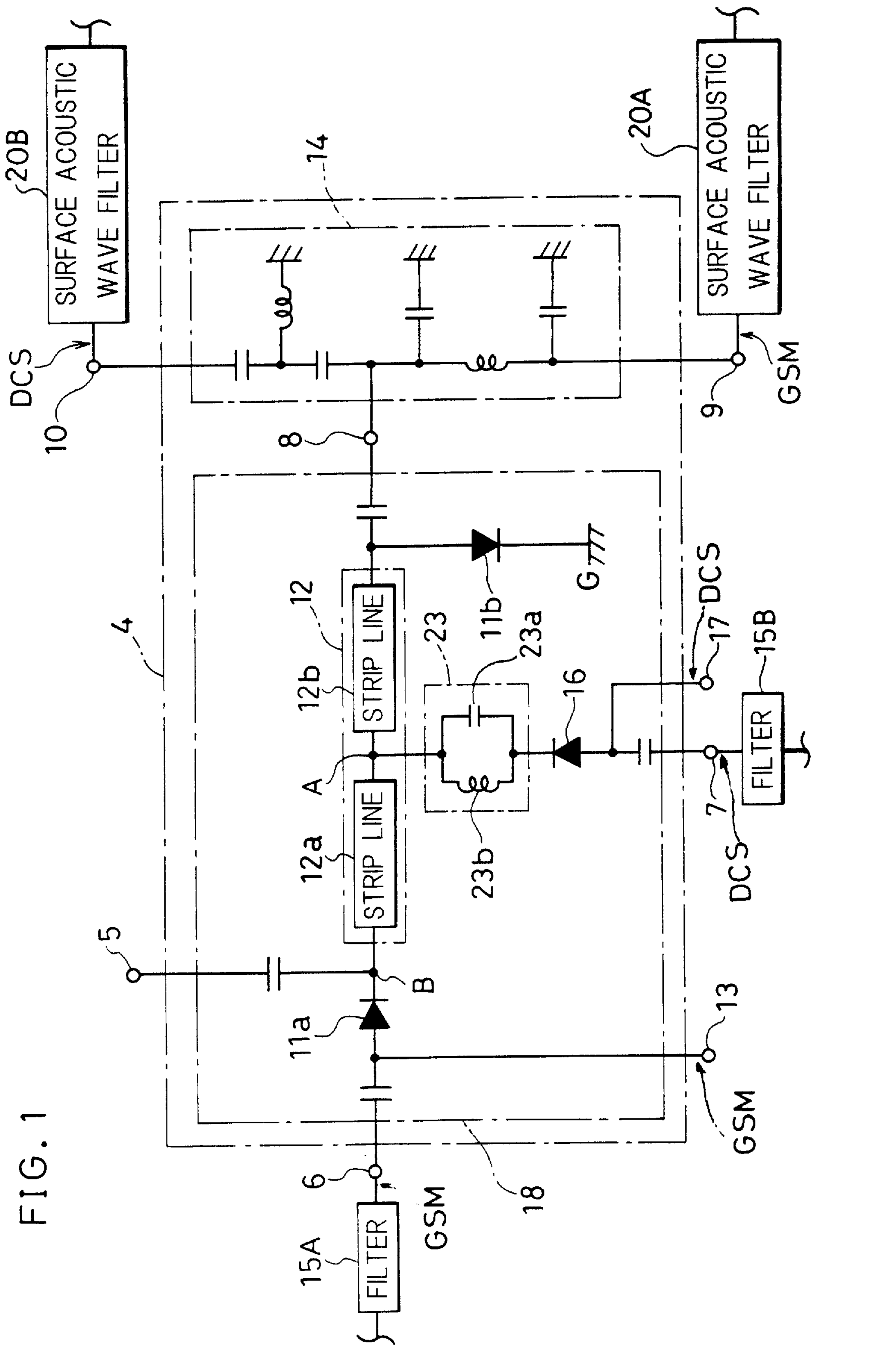
FIG. 1 is a circuit diagram of a multiband high-frequency switch in accordance with a first embodiment of the present invention.

FIG. 1 is a circuit diagram of a multiband high-frequency switch 4 in accordance with a first embodiment of the present invention for a mobile phone capable of dealing with two different frequency bands. An example of a mobile phone capable of dealing with two different frequency bands is a mobile phone capable of dealing with the GSM frequency band and the DCS frequency band for European digital mobile phones. Another example is a mobile phone capable of dealing with the DAMPS frequency band and the PCS frequency band for U.S. digital mobile phones. In this embodiment, the mobile phone capable of dealing with the GSM frequency band (hereafter referred to as GSM) and the DCS frequency band (hereafter referred to as DCS) is taken as an example and described.

The multiband high-frequency switch 4 shown in FIG. 1 has an antenna port 5, a GSM-use transmitting port 6, a DCS-use transmitting port 7, a receiving-side port 8, a GSM-use receiving port 9 and a DCS-use receiving port 10 as input/output ports. The antenna port 5 is connected to the transmitting port 6 via a diode 11*a* serving as a first switching element. Furthermore, the antenna port 5 is connected to the receiving-side port 8 via a strip line 12. One terminal of the strip line 12 on the side of the receiving-side port 8 is connected to ground G via a diode 11*b* serving as a second switching element. A GSM-use control port 13, to which signals for controlling the ON/OFF operation of the two diodes 11*a* and 11*b* are input, is connected between the GSM-use transmitting port 6 and the diode 11*a*. The multiband high-frequency switch shown in FIG. 1 is an improvement of the SPDT (single-port double-throw) high-frequency switches 103 and 113 of the conventional multiband high-frequency switch 101 shown in FIG. 6.

The receiving port 9 and the receiving port 10 are connected to the receiving-side port 8 via a diplexer 14. The strip line 12 is divided into two portions. To the connection point A of the divided strip lines 12*a* and 12*b*, the transmitting port 7 is connected via a filter circuit 23 and a diode 16 serving as a third switching element. A DCS-use control port 17 for switching the transmission/reception of the DCS frequency band by controlling the ON/OFF operation of the two diodes 16 and 11*b* is connected between the transmitting port 7 and the diode 16. The diplexer 14 is a combination of a high-pass filter and a low-pass filter.

The operation of the multiband high-frequency switch 4 will be described below. In the case when the GSM frequency band is used, a control voltage is applied to the GSM-use control port 13 during transmission. The control voltage is a DC voltage of several volts, for example. As a result, both the diodes 11*a* and 11*b* are turned ON, whereby the transmitting port 6 is electrically connected to the antenna port 5. Since the receiving-side port 8 is grounded by the diode 11*b*, a transmitting signal input from the transmitting port 6 is transmitted efficiently to the antenna port 5.

During reception, the application of the control voltage to the GSM-use control port 13 is stopped, whereby both the diodes 11*a* and 11*b* are turned OFF. As a result, the antenna port 5 is electrically disconnected from the transmitting port 6, and the grounding connection of the strip line 12 by the diode 11*b* becomes open. Hence, a receiving signal input from the antenna port 5 is transmitted to the receiving-side port 8 and then selectively transmitted to the receiving port 9 via the diplexer 14 disposed at the subsequent stage. When the GSM frequency band is used, no control voltage is applied to the DCS-use control port 17.

When using the DCS frequency band, a control voltage is applied to the DCS-use control port 17 during transmission. As a result, both the diodes 16 and 11*b* are turned ON, whereby the transmitting port 7 is electrically connected to the antenna port 5. Since the receiving-side port 8 is grounded by the diode 11*b*, a transmitting signal input from the transmitting port 7 is efficiently transmitted to the antenna port 5.

During reception, the application of the control voltage to the DCS-use control port 17 is stopped, whereby both the diodes 16 and 11*b* are turned OFF. As a result, the antenna port 5 is electrically disconnected from the transmitting port 7, and the grounding connection of the strip line 12 by the diode 11*b* becomes open. Hence, a receiving signal input from the antenna port 5 is transmitted to the receiving-side port 8 and selectively transmitted to the receiving port 10 via the diplexer 14 disposed at the subsequent stage. When the DCS frequency band is used, no control voltage is applied to the GSM-use control port 13, whereby the antenna port 5, having been connected to the transmitting port 6 via the diode 11*a*, is electrically disconnected from the transmitting port 6.

The multiband high-frequency switch 4 in accordance with this embodiment can be configured by one high-frequency switch 18 and one diplexer 14 as shown in FIG. 1. Hence, when this multiband high-frequency switch 4 is compared with the conventional multiband high-frequency switch 101 comprising the diplexer 102 and the two high-frequency switches 103 and 113 shown in FIG. 6, numerous circuit elements including the diode 19C can be eliminated. As a result, the multiband high-frequency switch in accordance with this embodiment can be made compact.

Figure 6:
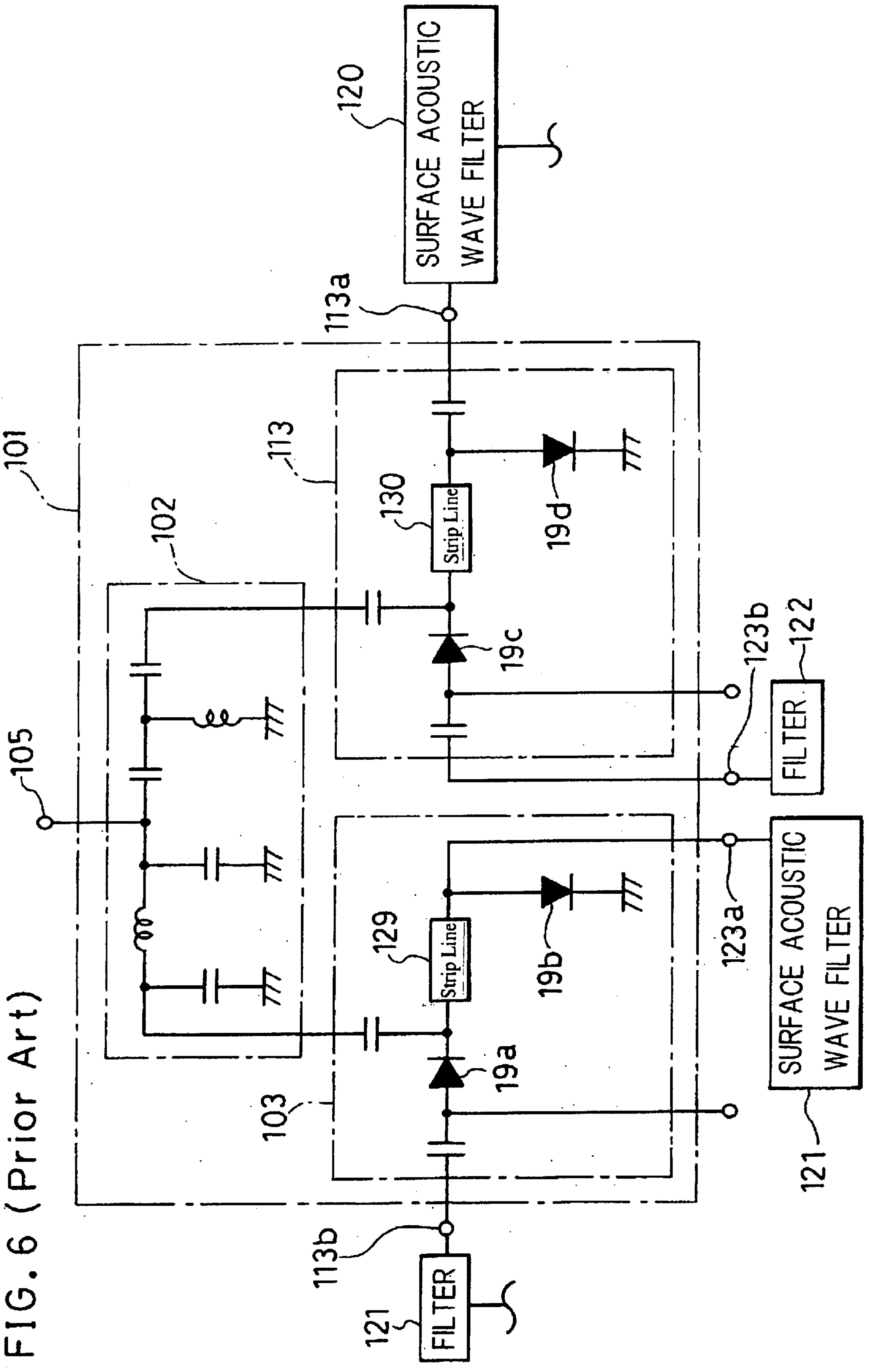
FIG. 6 (Prior Art)
FIG. 6 is the circuit diagram of the conventional multiband high-frequency switch.

In the conventional multiband high-frequency switch 101 shown in FIG. 6, the insertion loss of a transmitting signal input from the transmitting port 113*b* and output from the antenna port 105 during transmission is the sum of the insertion loss of the high-frequency switch 103 and the insertion loss of the diplexer 102.

On the other hand, in the multiband high-frequency switch 4 in accordance with this embodiment shown in FIG. 1, its insertion loss during transmission is only the insertion loss due to the diode 11*a* or 16 (corresponding to the insertion loss due to the high-frequency switches 103 and 113). Hence, the insertion loss of the multiband high-frequency switch 4 in accordance with this embodiment becomes smaller than that of the conventional multiband high-frequency switch. As a result, in a mobile phone incorporating the multiband high-frequency switch 4 in accordance with this embodiment, current consumption during transmission becomes smaller, whereby the usable period of the battery of the mobile phone can be extended.

In this embodiment, the sum of the electrical lengths of the strip lines 12*a* and 12*b* connected between the antenna port 5 and the receiving-side port 8 is set at a quarter of the wavelength corresponding to a transmission frequency in the GSM frequency band. Furthermore, the electrical length of the strip line 12*b* connected to the receiving-side port 8 is set at a quarter of the wavelength corresponding to a transmission frequency in the DCS frequency band. This improves the isolation between the transmitting circuit and the receiving circuit in the GSM frequency band and the DCS frequency band.

The above-mentioned improvement is based on the following reasons. During transmission in the GSM frequency band, when the sum of the electrical lengths of the strip lines 12*a* and 12*b* is set at a quarter of the wavelength corresponding to the GSM transmission frequency, the impedance at the GSM transmission frequency on the side of the receiving port 9 viewed from the connection point B between the antenna port 5 and the transmitting port 6 becomes infinite since one terminal of the strip line 12*b* is grounded. Hence, the transmitting circuit is isolated from the receiving circuit during transmission in the GSM frequency band. In addition, during the transmission in the DCS frequency band, when the electrical length of the strip line 12*b* is set at a quarter of the wavelength corresponding to the DCS transmission frequency, the impedance at the DCS transmission frequency on the side of the receiving port 10 viewed from the connection point A between the transmitting port 7 and the strip line 12*b* becomes infinite since the one terminal of the strip line 12*b* is grounded. Hence, the transmitting circuit is isolated from the receiving circuit during transmission in the DCS frequency band. During transmission in the DCS frequency band, the strip line 12*a* functions as just a transmission line for connecting the antenna port 5 to the strip line 12*b*. The sum of the electrical lengths of the strip lines 12*a* and 12*b* should practically be a quarter of the wavelength corresponding to a transmission frequency in the GSM frequency band. However, a similar effect can also be obtained even when the sum of the electrical lengths is set at three quarters of the wavelength obtained by adding a quarter of the wavelength to an integral multiple of a half of the wavelength, for example.

Since the sum of the electrical lengths of the strip lines 12*a* and 12*b* is set at a quarter of the wavelength corresponding to a GSM transmission frequency, the sum of the electrical lengths becomes equal to the electrical length of the strip line 129 of the high-frequency switch 103 on the GSM side of the conventional multiband high-frequency switch 101 shown in FIG. 6. Hence, the configuration of the high-frequency switch in accordance with this embodiment shown in FIG. 1 becomes substantially equal to a configuration obtained by eliminating the DCS-side strip line 130 from the configuration shown in FIG. 6. As a result, the number of components can be reduced practically, and the multiband high-frequency switch 4 can be made compact.

In the multiband high-frequency switch 4 in accordance with the first embodiment, three diodes 11*a*, 11*b* and 16 are used to carry out switching between the GSM frequency band and the DCS frequency band and to carry out switching between transmission and reception in each frequency band. Generally, a diode has a capacitance between its terminals and a parasitic inductance. Usually, when the diode is OFF, it cannot completely perform signal cutoff because of the capacitance and parasitic inductance. For example, during transmission in the GSM frequency band, a part of a transmitting signal input from the transmitting port 6 leaks to the DCS-use transmitting port 7 via the diode 16 which is in OFF-state. This increases the insertion loss of the transmitting signal by the amount of the leakage.

To prevent the leakage, a filter is connected to at least one of the transmitting ports, for example, the transmitting port 6, to attenuate the transmitting signal in the frequency band passing through the other transmitting port 7. As a result, when the transmitting signal is input from the transmitting port 7, the transmitting signal can be prevented from leaking outside from the transmitting port 6.

Furthermore, when the multiband high-frequency switch 4 in accordance with this embodiment is used, a band-pass filter or a low-pass filter is used as a filter 15A connected to the GSM-use transmitting port 6 corresponding to the frequency band of 800 MHz, for example. Moreover, a band-pass filter is used as a filter 15B connected to the DCS-use transmitting port 7 corresponding to the frequency band of 1.8 GHz, for example. It is thus possible to attenuate harmonics generating at a power amplifier section (not shown) connected to the transmitting port 7 via the filter 15B. In addition, it is possible to prevent signal leakage from one of the transmitting ports, for example, the transmitting port 7, to the other transmitting port, that is, the transmitting port 6. In other words, the filter 15A connected to the GMS-use transmitting port 6 should only attenuate a DCS transmitting signal and harmonics generating at a power amplifier section connected to the GSM-use transmitting part 6 via the filter 15A. Hence, a low-pass filter capable of passing a GSM transmitting signal and attenuating signals having higher frequencies or a band-pass filter capable of passing only the GSM transmitting signal should only be connected to the transmitting port 6. On the other hand, the filter 15B connected to the DCS-use transmitting port 7 must attenuate both harmonics generating at the power amplifier section to be connected to the transmitting port 7 via the filter 15B and the GSM transmitting signal that is on the low-frequency side of the DCS transmitting signal. Hence, a band-pass filter capable of passing only the DCS transmitting signal is connected as the filter 15B connected to the transmitting port 7.

In the multiband high-frequency switch 4 in accordance with this embodiment, during transmission in the GSM frequency band, the sum of the electrical lengths of the strip lines 12*a* and 12*b* is set at a quarter of the wavelength corresponding to the GSM transmission frequency. In addition, the impedance at the GSM transmitting frequency on the side of the receiving port 9 viewed from the connection point B between the antenna port 5 and the GSM transmitting port 6 becomes infinite since the one terminal of the strip line 12*b* is grounded. By the infinite impedance, the transmitting circuit is isolated from the receiving circuit during signal transmission in the GSM frequency band. However, since the diode 16 which is in OFF-state is connected between the divided strip lines 12*a* and 12*b*, the capacitance between the terminals of the diode 16 in particular is added to the strip line 12. This added capacitance decreases the impedance of the strip line 12, thereby deteriorating the isolation.

In the multiband high-frequency switch 4 in accordance with this embodiment, the filter circuit 23 for attenuating a transmitting signal in the GSM frequency band, which is input from the transmitting port 6, is provided between the diode 16 and the connection point A to prevent the isolation from deteriorating. The frequency characteristic of the filter circuit 23 prevents the influence of the capacitance between the terminals of the diode 16 on the strip line 12.

The filter circuit 23 should preferably be an LC parallel resonance circuit (the so-called notch circuit) comprising a capacitor 23*a* and an inductor 23*b* connected in parallel with each other so as to attenuate only a predetermined frequency band (the GMS frequency band in this case) so that an appropriate band-passing characteristic can be obtained in the other frequency bands. This notch circuit is connected between the connection point A and the diode 16.

In the multiband high-frequency switch 4 in accordance with this embodiment, the diode 11*b* must ground the one terminal of the strip line 12 during transmission in the GSM frequency band and during transmission in the DCS frequency band. It is thus desired to provide a filter circuit capable of preventing the influence of the parasitic inductance generating in the diode 11*b* when it is in ON-state in the GSM and DCS frequency bands different from each other. It is therefore desired to connect a filter circuit 24 comprising an inductor 24*a* connected in series with the parallel connection of an inductor 24*b* and a capacitor 24*c* between the diode 11*b* and ground. In the filter circuit 24, the parasitic inductance generating in the diode 11*b* and the inductance of the inductor 24*a* form a quarter-wave line in the DCS transmission frequency. The inductance of the inductor 24*b* and the capacitance of the capacitor 24*c* are set so that the resonance frequency of the LC parallel circuit becomes the DCS transmission frequency. Under this condition, the resonance frequency of the series connection of the capacitor 24*c* and the quarter-wave line formed of the parasitic inductance generating in the diode 11*b* and the inductance of the inductor 24*a* at the DCS transmission frequency is set so as to become equal to the GSM transmission frequency. Hence, the ground-side terminal of the quarter-wave line formed of the parasitic inductance generating in the diode 11*b* and the inductance of the inductor 24*a* at the DCS transmission frequency becomes open owing to the parallel resonance of the inductor 24*b* and the capacitor 24*c* during DCS transmission, and the other terminal is short-circuited. In other words, the receiving-side port 8 of the strip line 12 is completely grounded without any influence of the diode 11*b*. Furthermore, during GSM transmission, the receiving-side port 8 of the strip line 12 is completely grounded without any influence of the diode 11*b* by the series resonance of the capacitor 24*c* and the quarter-wave line formed of the parasitic inductance generating in the diode 11*b* and the inductance of the inductor 24*a*.

In other words, by connecting the filter circuit 24 to the diode 11*b* connected to the strip line 12, one terminal of the strip line 12 can be connected to ground in states ideal for the two different frequencies, that is, GSM and DCS.

The reason why the quarter-wave line is formed of the parasitic inductance generating in the diode 11*b* and the inductance of the inductor 24*a* at a frequency in the DCS frequency band is that the electrical length of the inductor 24*a* can be shorted since the DCS frequency band is higher than the GSM frequency band. A similar effect can also be obtained when the quarter-wave line at a frequency in the GSM frequency band is formed of the parasitic inductance generating in the diode 11*b* and the inductance of the inductor 24*a*. In this case, however, the inductance of the inductor 24*b* and the capacitance of the capacitor 24*c* must be set so that the above-mentioned frequency of the series resonance is set at the DCS transmission frequency.

Each of the diodes 11*a*, 11*b* and 16 of the multiband high-frequency switch 4 shown in FIG. 1 functions as a cutoff circuit for cutting off the circuits disposed prior and subsequent thereto when the diode is in OFF-state. However, each of the diodes 11*a*, 11*b* and 16 has a nonnegligible capacitance between the terminals thereof, and this capacitance between the terminals makes the circuit cutoff incomplete. In particular, the multiband high-frequency switch 4 deals with frequencies in the two different frequency bands, that is, GSM and DCS. Hence, the multiband high-frequency switch 4 requires a filter circuit for preventing the influence of the capacitance between the terminals in each of the frequency bands.

Figure 3:
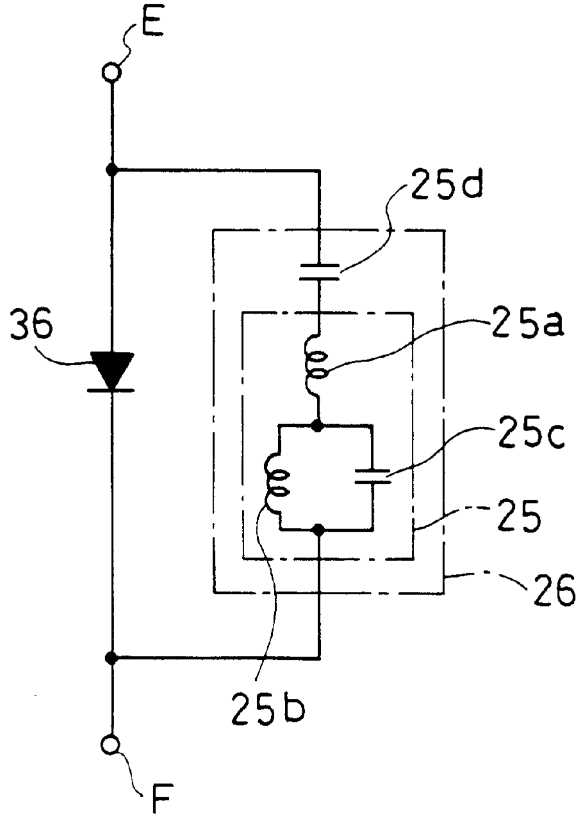
FIG. 3 is a circuit diagram of a filter circuit to be connected to each switching element of the multiband high-frequency switch in the first embodiment.

FIG. 3 shows a cutoff circuit for making the circuit cutoff complete. In FIG. 3, a filter circuit 25 is formed by connecting an inductor 25*a* in series with the parallel connection of an inductor 25*b* and a capacitor 25*c*. The series connection of the filter circuit 25 and a DC cutoff capacitor 25*d* is connected in parallel with a diode 36, thereby forming a cutoff circuit. The diode 36 corresponds to either of the diodes 11*a*, 11*b* and 16 shown in FIG. 1.

The filter circuit 25 cuts off the circuits connected to terminals E and F by using the parallel resonance of the capacitance generating between the terminals of the diode 36 and the inductors 25*a* and 25*b* at the GSM frequency. In addition, at the DCS frequency, the filter circuit 25 cuts off the circuits connected to the terminals E and F by using the parallel resonance of the capacitance between the terminals of the diode 36 and the inductor 25*a* and the capacitor 25*c* connected in parallel with the capacitance between the terminals at the DCS frequency.

The cutoff circuit shown in FIG. 3 utilizes the fact that the impedance of the inductor 25*b* is high at a high frequency and that the impedance of the capacitor 25*c* is high at a low frequency. In the parallel connection of the inductor 25*b* and the capacitor 25*c*, the DCS frequency signal having a frequency higher than that of the GSM frequency signal mainly passes through the capacitor 25*c* having a lower impedance. Hence, the cutoff circuit cuts off the circuits connected to the terminals E and F by using the parallel resonance of the capacitance between the terminals of the diode 36 and the inductors 25*a* and 25*b* connected in parallel with the capacitance between the terminals.

On the other hand, the GSM frequency signal having a lower frequency passes through the inductor 25*b* having a lower impedance in the parallel connection of the inductor 25*b* and the capacitor 25*c*. Hence, the cutoff circuit cuts off the circuits connected to the terminals E and F by using the parallel resonance of the capacitance between the terminals of the diode 36 and the inductor 25*a* and the capacitor 25*c* connected in parallel with the capacitance between the terminals.

Since the filter 25 can prevent the influence of the capacitance generating between the terminals of a general diode when it is in OFF-state, the filter circuit 25 is effective for all of the diodes 11*a*, 11*b* and 16 shown in FIG. 1. The filter circuit 25 is particularly effective for the diode 11*b* connected to the strip line 12.

The filter circuit 25 can also prevent the influence of the capacitance generating between the terminals of the diode 11*b* when it is OFF during reception. Since respective power amplifier sections having high impedances are connected to the transmitting ports 6 and 7, there is a little leakage of the receiving signal due to the capacitance between the terminals of each of the diode 11*a* and the diode 16. On the other hand, the diode 11*b* is directly connected to the receiving path extending from the antenna port 5 to the receiving-side port 8, and one terminal of the diode is grounded. Hence, the anode of the diode 11*b* is directly grounded by the capacitance between the terminals thereof. The connection of the filter circuit 25 is effective to prevent the direct grounding of the anode side owing to the capacitance between the terminals of the diode 11*b*.

In the multiband high-frequency switch 4, the receiving signal input from the antenna port 5 is subjected to the transmission/reception switching by the diodes 11*a*, 11*b* and 16 and roughly diplexed by the diplexer 14 comprising a combination of LC elements, and then output from each of the receiving ports 9 and 10. The receiving signal therefore includes much noise. To solve this problem, in some cases, surface acoustic wave filters 20A and 20B for eliminating the noise included in the receiving signal are usually connected externally at the subsequent stages of the receiving ports 9 and 10, respectively. The receiving signal from the receiving-side port 8 is first diplexed into a high-frequency signal and a low-frequency signal by the diplexer 14 comprising a low-pass filter and a high-pass filter. The diplexed receiving signals become predetermined GSM and DCS receiving signals by virtue of the surface acoustic wave filters 20A and 20B, respectively.

The surface acoustic wave filters 20A and 20B are filters for allowing only the signals having predetermined frequencies to pass. Hence, in the case when the surface acoustic wave filters 20A and 20B are provided at the subsequent stages, signal diplexing by the diplexer 14 is not required. Therefore, it is not necessary to provide the diplexer 14.

<<Second Embodiment>>

A multiband high-frequency switch 4A in accordance with a second embodiment of the present invention will be described below referring to FIG. 4. In the multiband high-frequency switch 4A shown in FIG. 4, a duplexer 22 is provided at the receiving-side port 8. Since the external surface acoustic wave filters 20A and 20B are included in the duplexer 22, the diplexer 14 shown in FIG. 1 is not provided. This configuration can make the multiband high-frequency switching 4A compact. Since the diplexer 14 is not provided, the signal paths from the transmitting ports 6 and 7 to the antenna port 5 of the multiband high-frequency switch 4A can be shortened. In addition, the signal paths from the receiving ports 9 and 10 to the antenna port 5 can also be shortened. As a result, the insertion losses during signal transmission and reception can be reduced further.

Figure 4:
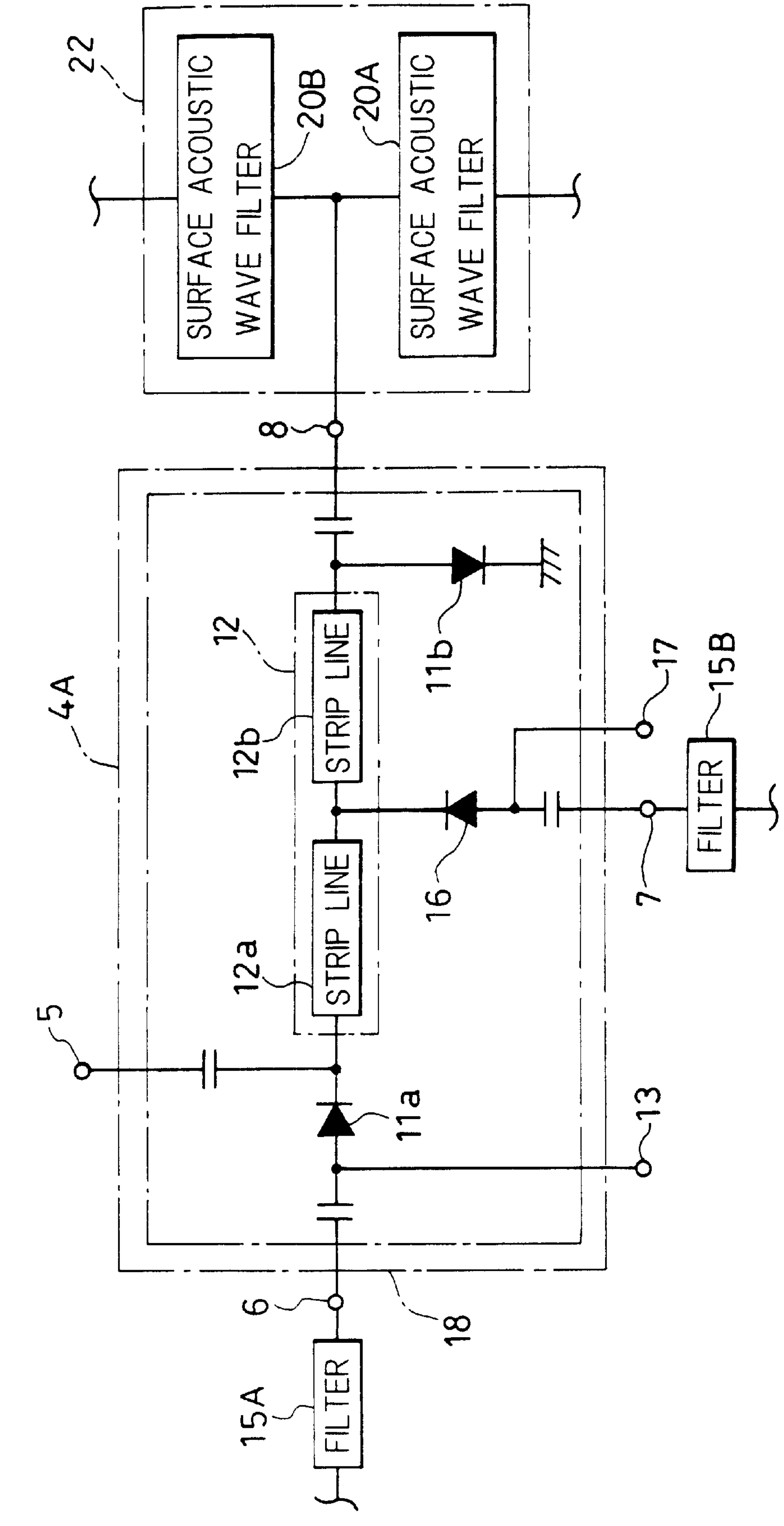
FIG. 4 is a circuit diagram of a multiband high-frequency switch in accordance with a second embodiment of the present invention.

In the duplexer 22 including the two surface acoustic wave filters 20A and 20B connected to the receiving-side port 8 as shown in FIG. 4, the impedances of the two surface acoustic wave filters 20A and 20B must be matched with each other sufficiently.

The duplexer 22 including the two surface acoustic wave filters 20A and 20B is commercially available as a compact chip component. Hence, when the multiband high-frequency switch 4A is modularized as a laminated component including dielectric members, the duplexer 22 can be mounted on the surface thereof. Therefore, the multiband high-frequency switch 4A can be made sufficiently smaller than the conventional multiband high-frequency switch externally provided with surface acoustic wave filters. Hence, it is possible to raise the value of the multiband high-frequency switch 4A as a commodity.

<<Third Embodiment>>

The multiband high-frequency switches 4 and 4A in accordance with the first and second embodiments deal with two different frequency bands as described above. By adding high-frequency circuits to each of the multiband high-frequency switches 4 and 4A, it is possible to obtain a multiband high-frequency switch capable of dealing with three or more frequency bands.

A third embodiment of the present invention is a multiband high-frequency switch dealing with three frequency bands.

Figure 5:
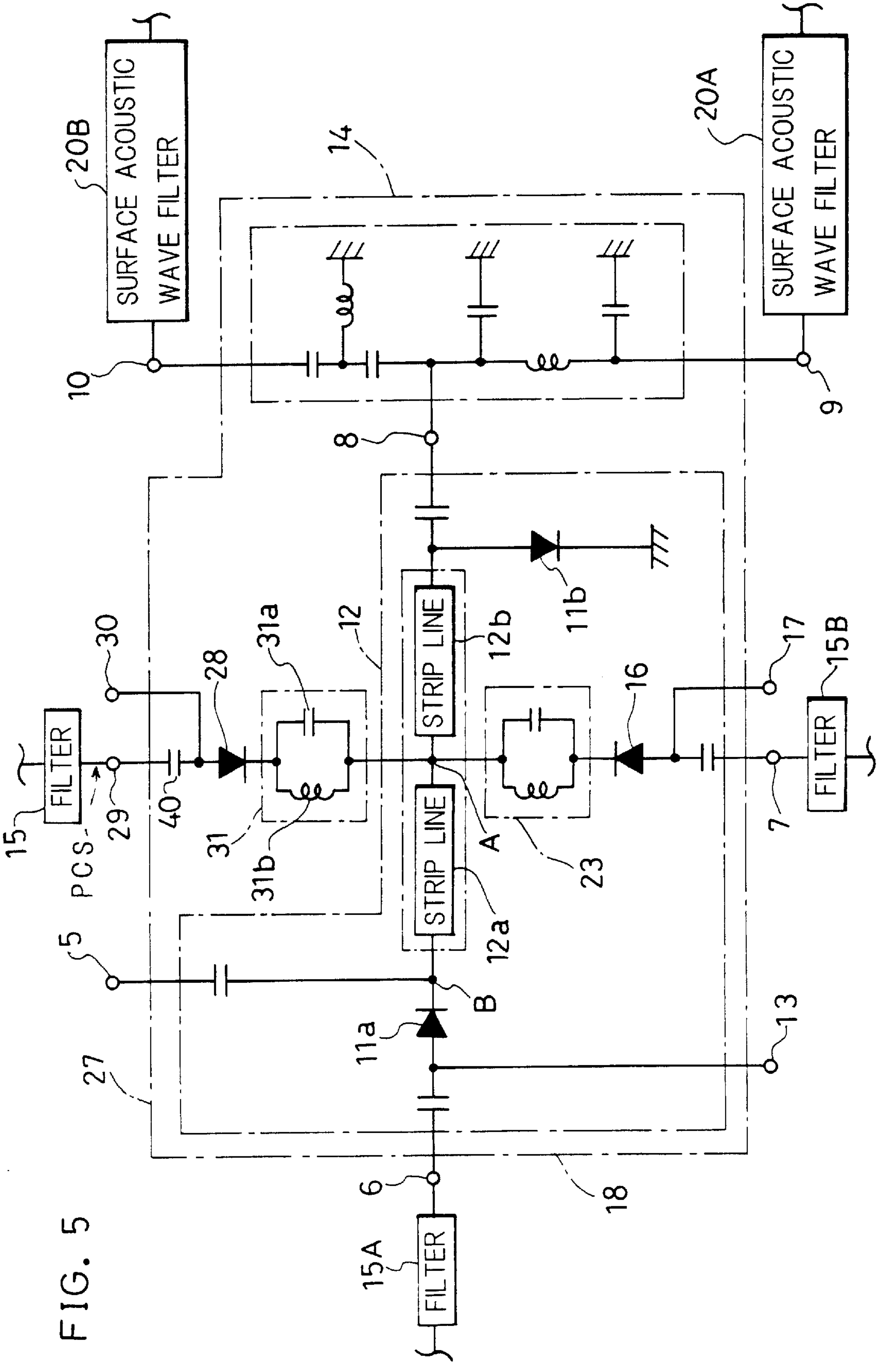
FIG. 5 is a circuit diagram of a multiband high-frequency switch in accordance with a third embodiment of the present invention.

FIG. 5 is a circuit diagram of a multiband high-frequency switch 27 in accordance with the third embodiment. The multiband high-frequency switch 27 differs from the multiband high-frequency switch 4 shown in FIG. 1 in the following points.

Although the multiband high-frequency switch 4 shown in FIG. 1 is a dual band type to deal with two bands, that is, the GSM frequency band and the DCS frequency band, the multiband high-frequency switch 27 shown in FIG. 5 is a triple band type to deal with three bands including the PCS frequency band in addition to the above-mentioned two frequency bands. In the multiband high-frequency switch 27 of this embodiment, a PCS-use receiving port 29 is connected to the connection point A of the strip line 12 of the multiband high-frequency switch 4 shown in FIG. 1 via a filter circuit 31, a diode 28 and a capacitor 40. Furthermore, a control port 30 is connected between the capacitor 40 and the diode 28. The transmitting port 7 is used for both the DCS and PCS frequency bands. Except for these points, the configuration shown in FIG. 5 is the same as that shown in FIG. 1.

The reason why the transmitting port 7 is used for both the DCS and PCS frequency bands is that the DCS frequency band and the PCS frequency band are close to each other, and that peripheral circuits, such as the filter 15B and a power amplifier to be connected to the transmitting port 7 via the filter 15B, can be used for both the DCS and PCS frequency bands.

When carrying out transmission/reception in the GSM or DCS frequency bands, no control voltage is applied to the control port 30, whereby the diode 28 is turned OFF. During transmission in the PCS frequency band, a control voltage is applied to the control port 17 to turn ON the diodes 16 and 11*b*, just as in the case of the transmission in the DCS frequency band. As a result, transmission in the PCS frequency band is carried out. When carrying out reception in the PCS frequency band, a control voltage is applied to the control port 30 to turn ON the diodes 28 and 11*b* and to turn OFF the other diodes 11*a* and 16. As a result, reception in the PCS frequency band is carried out.

Even in the multiband high-frequency switch 27, the filter circuit 31 similar to the filter circuit 23 shown in FIG. 1 is provided between the diode 28 and the connection point A to prevent the isolation by the diode 28 from deteriorating. The influence of the capacitance between the terminals of the diode 28 on the strip line 12 can be prevented by the frequency characteristic of the filter circuit 31.

The filter circuit 31 should preferably be an LC parallel resonance circuit (so-called notch circuit) comprising a capacitor 31*a* and an inductor 31*b* connected in parallel with each other, capable of attenuating only a predetermined frequency band (the GSM frequency band in this case) and capable of satisfactorily passing the other frequency bands. The filter circuit 31 is disposed between the connection point A and the diode 28.

Figure 2:
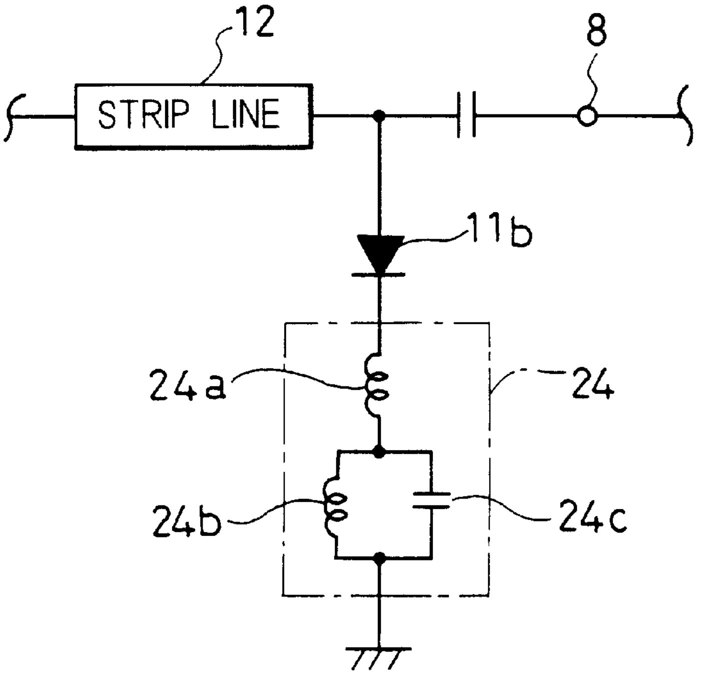
FIG. 2 is a circuit diagram of a filter circuit to be connected to a second switching element of the multiband high-frequency switch in the first embodiment.

Even the multiband high-frequency switch 27 can have effects similar to those described above by adding the filter circuits 24 and 25 described referring to FIG. 2 and FIG. 3 to the diode 28.

What is claimed is:

1. A multiband high-frequency switch comprising:

a first switching element provided between an antenna port and a first transmitting port, a strip line connected between said antenna port and a receiving-side port, a second switching element, one terminal of which is connected between said strip line and said receiving-side port and the other terminal of which is grounded, and a first control port connected between said first switching element and said first transmitting port, wherein first and second receiving ports are connected to said receiving-side port via a diplexer, said strip line is formed of first and second strip lines connected in series, a second transmitting port is connected between said first and second strip lines via a third switching element, and a second control port is connected between said second transmitting port and said third switching element.

2. A multiband high-frequency switch in accordance with claim 1, wherein the sum of the electrical lengths of said first and second strip lines is set at a quarter of the wavelength corresponding to the frequency of a signal passing through said first transmitting port, and the electrical length of said second strip line is set at a quarter of the wavelength corresponding to the frequency of a signal passing through said second transmitting port.

3. A multiband high-frequency switch in accordance with claim 1, wherein to at least one of said first and second transmitting ports, a filter having an attenuating characteristic in a frequency band including the frequency of a transmitting signal passing through the other transmitting port is connected.

4. A multiband high-frequency switch in accordance with claim 3, wherein one of a band-pass filter and a low-pass filter is connected to one transmitting port of said first and second transmitting ports, and a band-pass filter is connected to the other transmitting port.

5. A multiband high-frequency switch in accordance with claim 1, wherein a filter circuit having an attenuating characteristic in a frequency band including the frequency of a first transmitting signal input from said first transmitting port is provided between said third switching element and the connection point of said first and second strip lines.

6. A multiband high-frequency switch in accordance with claim 5, wherein said filter circuit is formed of a parallel resonance circuit comprising a first capacitor and a first inductor.

7. A multiband high-frequency switch in accordance with claim 1, wherein a filter circuit having an attenuating characteristic in a frequency band including the frequency of the first transmitting signal input from said first transmitting port and also having an attenuating characteristic in a frequency band including the frequency of a second transmitting signal input from said second transmitting port is connected to said second switching element.

8. A multiband high-frequency switch in accordance with claim 7, wherein said filter circuit comprising a third inductor connected in series with the parallel connection of a second capacitor and a second inductor is connected between said second switching element and ground.

9. A multiband high-frequency switch in accordance with claim 1, wherein a series connection comprising the parallel connection of a third capacitor and a fourth inductor connected in series with a fifth inductor and a fourth capacitor for cutting direct currents is connected in parallel with at least one of said first, second and third switching elements.

10. A multiband high-frequency switch in accordance with claim 9, wherein said series connection comprising the parallel connection of said third capacitor and said fourth inductor connected in series with said fifth inductor and said fourth capacitor for cutting direct currents is connected in parallel with said second switching element.

11. A multiband high-frequency switch in accordance with claim 1, wherein a third receiving port is connected between said first and second strip lines via a fourth switching element, and a third control port is connected between said third receiving port and said fourth switching element.

12. A multiband high-frequency switch in accordance with claim 11, wherein a filter circuit having an attenuating characteristic in a frequency band including the frequency of said first transmitting signal input from said first transmitting port is connected between said fourth switching element and the connection point of said first and second strip lines.

13. A multiband high-frequency switch in accordance with claim 12, wherein said filter circuit includes a parallel resonance circuit comprising a fifth capacitor and a sixth inductor.

14. A multiband high-frequency switch comprising:

a first switching element provided between an antenna port and a first transmitting port, the series connection of first and second strip lines connected between said antenna port and a receiving-side port, a second switching element, one terminal of which is connected between said series connection and said receiving-side port and the other terminal of which is grounded, a first control port connected between said first switching element and said first transmitting port, a second transmitting port connected between said first and second strip lines via a third switching element, and a second control port connected between said second transmitting port and said third switching element.

15. A multiband high-frequency switch in accordance with claim 14, wherein a duplexer including surface acoustic wave filters is connected to said receiving-side port 8.

* * * * *